(12) United States Patent
Lim et al.

(10) Patent No.: US 8,980,385 B2
(45) Date of Patent: Mar. 17, 2015

(54) OPTICAL FILM

(75) Inventors: Mi So Lim, Daegu (KR); Sang Hyun Baek, Gyeongsangbuk-do (KR)

(73) Assignee: Kolon Industries, Inc., Gwacheon-si (KR)

( * ) Notice: Subject to any disclaimer, the term of this patent is extended or adjusted under 35 U.S.C. 154(b) by 118 days.

(21) Appl. No.: 13/813,776

(22) PCT Filed: Aug. 3, 2011

(86) PCT No.: PCT/KR2011/005711
§ 371 (c)(1),
(2), (4) Date: Apr. 2, 2013

(87) PCT Pub. No.: WO2012/018227
PCT Pub. Date: Feb. 9, 2012

(65) Prior Publication Data
US 2013/0189515 A1    Jul. 25, 2013

(30) Foreign Application Priority Data

Aug. 4, 2010 (KR) ........................ 10-2010-0075278

(51) Int. Cl.
B32B 27/40 (2006.01)
G02B 1/00 (2006.01)
C09D 175/04 (2006.01)
G02B 1/10 (2006.01)
G02B 5/02 (2006.01)

(52) U.S. Cl.
CPC ................ *G02B 1/00* (2013.01); *C09D 175/04* (2013.01); *G02B 1/105* (2013.01); *G02B 5/0242* (2013.01); *G02B 5/0278* (2013.01); *Y10T 428/259* (2013.01); *Y10T 428/265* (2013.01)
USPC ........................... 428/1.6; 428/423.7; 528/65

(58) Field of Classification Search
USPC ................ 428/1.6, 423.7; 528/44, 65
See application file for complete search history.

(56) References Cited

U.S. PATENT DOCUMENTS

| 5,963,373 | A | * | 10/1999 | Kayanoki | .................... | 359/581 |
| 6,777,070 | B1 | * | 8/2004 | Murata et al. | ................ | 428/323 |
| 7,569,269 | B2 | * | 8/2009 | Takada et al. | ................ | 428/323 |
| 2008/0013179 | A1 | * | 1/2008 | Kobayashi et al. | ........... | 359/587 |
| 2008/0266661 | A1 | | 10/2008 | Nakamura | | |

FOREIGN PATENT DOCUMENTS

| JP | 3536067 B2 | 6/2004 |
| JP | 2007-119599 A | 5/2007 |
| JP | 2008018652 A | 1/2008 |
| KR | 10-2007-0119531 A | 12/2007 |
| KR | 10-2008-0008346 A | 1/2008 |
| KR | 10-2009-0104590 A | 10/2009 |
| KR | 10-0959269 B1 | 5/2010 |

OTHER PUBLICATIONS

Korean Patent and Trademark Office, Office Action issued in Korean Patent Application No. 10-2010-0075278 dated Jan. 28, 2014.

(Continued)

*Primary Examiner* — Thao T. Tran
(74) *Attorney, Agent, or Firm* — Sughrue Mion, PLLC

(57) ABSTRACT

Provided is an optical film including a polyurethane coating layer including high refractive inorganic materials to lower reflectivity without causing a rainbow phenomenon.

9 Claims, 2 Drawing Sheets

(56) References Cited

OTHER PUBLICATIONS

International Searching Authority, International Search Report for PCT/KR2011/005711 dated Mar. 9, 2012.

Korean Intellectual Property Office, Communication dated Aug. 20, 2014, issued in corresponding Korean Application No. 10-2010-0075278.

* cited by examiner

| Classification | Surface of cross-cut area from which flaking has occurred. (Example for six paralled cuts) |
|---|---|
| 5 | NONE |
| 4 |  |
| 3 |  |
| 2 |  |
| 1 |  |
| 0 | Greater than 65% |

OPTICAL FILM

CROSS REFERENCE TO RELATED APPLICATIONS

This application is a National Stage of International Application No. PCT/KR2011/005711 filed Aug. 3, 2011, claiming priority based on Korean Patent Application No. 10-2010-0075278 filed Aug. 4, 2010, the contents of all of which are incorporated herein by reference in their entirety.

TECHNICAL FIELD

The present invention relates to an optical film. More specifically, the present invention relates to an optical film having a polyurethane coating layer including a high refractive inorganic material formed on one surface or both surfaces of a base film so as to provide excellent adhesion with a hard coating layer and excellent adhesion (heat and humidity resistance) under high temperature and high humidity while suppressing a rainbow phenomenon under a fluorescent lamp.

BACKGROUND ART

An optical film has been used for a display screen such as a touch panel, a liquid crystal display (LCD), a cathode ray tube (CRT) for TV or computer, a plasma display, or the like.

The optical film requires excellent transparency and visibility and uses a biaxially stretched polyester film having mechanical characteristics and electrical characteristics as a base film.

The biaxially stretched polyester film is insufficient in terms of surface hardness, wear resistance, or scratch resistance and thus, the surface thereof is easily damaged by a friction and contact with an object. In order to prevent this, a hard coating layer is stacked on a film surface. In order to improve the adhesion between the base, that is, the polyester film and the hard coating layer, a coating layer as an intermediate layer is disposed on the polyester film.

As the intermediate layer for improving the adhesion between the base layer and the hard coating layer, acrylic resin or urethane resin has been generally used. However, when forming the coating layer using the above-mentioned resin, a refractive index is about 1.5, which shows a large difference from a surface refractive index 1.66 of the biaxially stretched polyester film. As a result, interference stain, that is, a rainbow phenomenon occurs due to external light reflection between the surface of the polyester film and the intermediate layer. The rainbow phenomenon deteriorates the visibility and causes an eye fatigue when the rainbow phenomenon is generated on a display member. Therefore, a need exists for a method for improving the rainbow phenomenon.

DISCLOSURE

Technical Problem

The present invention relates to an optical biaxially stretched polyester film. More specifically, the present is to provide an optical film without a rainbow phenomenon.

In more detail, the present invention is to provide an optical film having excellent adhesion with a hard coating layer under high temperature and high humidity while suppressing a rainbow phenomenon when being applied to the hard coating layer.

Technical Solution

In order to achieve the above object, the present invention relates to an optical film in which high refractive filler (refractive index of 2.0 or more) is included in a polyurethane coating layer of a refractive index of 1.54 to 1.59.

The present inventors have researched a method of controlling the refractive index of a coating layer of an optical film, that is, the polyurethane coating layer to approximate to a refractive index 1.64 of the base film, that is, the biaxially stretched polyester film. As a result, when a polyurethane binder having a refractive index of 1.54 to 1.59 includes 0.5 to 30 wt % of high refractive filler having a refractive index of 2.0 or more, more preferably, a refractive index of 2.0 to 2.3, the present inventors found that the refractive index of the polyurethane coating layer is similar to the refractive index of the base film, which results in the improvement of the rainbow phenomenon. Accordingly, the present inventors complete the present invention based on the finding.

That is, the present invention includes the polyurethane coating layer including the high refractive filler as the coating layer coated on the base film and one surface or both surfaces thereof and includes an aromatic isocyanate compound in order to satisfy a range of the refractive index 1.54 to 1.59 of the polyurethane binder. In this case, the present inventors found that 25 to 90 wt % of the aromatic isocyanate compound is included in a total content of isocyanate, which may satisfy the refractive index. Accordingly, the present inventors complete the present invention based on the finding. When the refractive index is less than 1.54, the difference of refractive index from the base film is large, the rainbow phenomenon becomes serious. In order to increase the refractive index, a content of the high refractive filler needs to be higher than the range of the present invention, such that the stain occurrence becomes serious on a coating appearance during the manufacturing of the film and commerciality is degraded due to cost increase. In addition, when the refractive index exceeds 1.59, the excessive amount of the aromatic isocyanate compound is used to mismatch the equivalence ratio between polyol and isocyanate, such that unreacted materials remain to make coating non-uniform and the adhesion between the base film and the hard coating layer is deteriorated due to the use of a large amount of aromatic group.

In detail, the present invention reacts the polyol with the isocyanate compound including at least one aromatic isocyanate compound of the following Chemical Formula 1 to prepare the polyurethane binder having a refractive index of 1.54 to 1.59. Meanwhile, the present invention relates to an optical film in which the polyurethane coating composition including the high refractive inorganic filer is coated on one surface or both surfaces of the base film.

 [Chemical Formula 1]

(In the above Chemical Formula 1, Ar represents (C6-c30) arylene substituted or unsubstituted with (C1-C5) alkyl)

In more detail, in the above Chemical Formula 1, Ar may be naphthalene or phenalene.

In the present invention, 25 to 90 wt % of the aromatic isocyanate compound may be included in a total content of isocyanate. When the aromatic isocyanate compound in the range is used, the refractive index satisfies a range of 1.54 to 1.59. In particular, the present invention may use naphthalene diisocyanate as the aromatic isocyanate compound of the above Chemical Formula 1.

The polyol may use polyester based polyol or polyether based polyol, preferably, polyester based polyol. More preferably, the polyester based polyol having weight-average molecular weight of 600 to 3000 may be used.

The weight-average molecular weight may be measured using a multi angle light scattering (MALS) system (Wyatt Co.). A configuration of the MALS system is as follows.

Configuration of MALS System

GPC; Water 1525 Binary HPLC Pump

RI detector: Optilab rex
MALS; Wyatt Dawn 8+
Column; μ-Styragel HR 0.5, HR 1, HR 2, HT 3

The polyurethane binder may be an aqueous polyurethane binder having a solid content of 15 to 30 wt % of solid, including a reactive emulsifier having an ionic group and water.

In addition, the polyurethane coating composition may be a water dispersed or aqueous composition having a total solid content of 2 to 10 wt %, including 5 to 30 wt % of polyurethane binder, 0.5 to 30 wt % of water dispersed high refractive inorganic filler having a total solid content of 5 to 40 wt %, 0.1 to 0.4 wt % of wetting agent, and 0.1 to 0.5 wt % of silica having an average particle size of 100 to 200 nm.

The polyurethane coating composition is coated with a dry coating thickness of 15 to 150 nm.

As the base film, polyethylene terephthalate film may be used.

The optical film according to the present invention includes a hard coating film further including a hard coating layer or an antireflective film further including an anti-glare coating layer.

The present invention will be described in more detail below.

As the base film used in the present invention, a polyester film, in more detail, a film obtained by performing melt extrusion on a polyethylene terephthalate pellet having intrinsic viscosity of 0.60 to 0.65 may be used, which has excellent light transmittance. In this case, the base film having, preferably, the refractive index of 1.63 to 1.65, more preferably, 1.64 may be used. In order to satisfy the range of the refractive index, additives or fillers may be added. As the polyethylene terephthalate film, a stretched film may be used and a uniaxially or biaxially stretched film may be used.

In the present invention, the polyurethane coating layer is prepared by reacting the polyol with the isocyanate compound including at least one aromatic isocyanate compound of the following Chemical Formula 1 to coat the polyurethane coating composition for the optical film included in the polyurethane binder having a refractive index of 1.54 to 1.59 and 0.1 to 30 wt % of high refractive inorganic filler having a refractive index of 2.1 on one surface or both surfaces of the base film.

    [Chemical Formula 1]

(In the above Chemical Formula 1, Ar represents (C6-c30) arylene substituted or unsubstituted with (C1-C5) alkyl)

In the above Chemical Formula 1, Ar may be naphthalene or phenalene. More preferably, the naphthalene may be used. As the compound, there is naphthalene diisocyanate.

In the present invention, 25 to 90 wt % of the aromatic isocyanate compound may be included in a total content of isocyanate. When the aromatic isocyanate compound in the range is used, the refractive index satisfies a range of 1.54 to 1.59. As the isocyanate compound that may be used together with the aromatic isocyanate compound, any isocyanate compound generally used in the art may be used without being limited. Preferably, using hexamethylene diisocyanate is advantageous in a reaction control during the manufacturing of prepolymer and makes the appearance of the coating layer uniform when the polyurethane composition is coated.

When the content of the aromatic isocyanate compound, in particular, a content of the naphthalene diisocyanate is mixed in the range of 25 to 90 wt %, the targeted refractive index of 1.54 to 1.59 may be achieved.

In present invention, the polyol may use polyester based polyol or polyether based polyol, preferably, polyester based polyol. As the polyester based polyol is polyol prepared from the reaction of carboxylic acid, sebacic acid, or acid anhydride with polyhydric alcohol. Although a kind of polyol is not limited thereto, using the polyester poly having average-weight molecular weight of 600 to 3000 is efficient in increasing the refractive index of the final reacted material and improving the increase in adhesion and the physical strength.

In the present invention, the polyurethane coating composition may be a water dispersed or aqueous composition having a total solid content of 2 to 10 wt %, including 5 to 30 wt % of polyurethane binder having a solid content of 15 to 30 wt %, 0.5 to 30 wt % of water dispersed high refractive inorganic filler having a solid content of 5 to 40 wt %, 0.1 to 0.4 wt % of wetting agent, and 0.1 to 0.5 wt % of silica having an average particle size of 100 to 200 nm.

The polyurethane binder may be an aqueous polyurethane binder having a solid content of 15 to 30 wt %, including a reactive emulsifier having an ionic group and water In detail, the polyurethane binder may be composed of 5 to 10 wt % of polyol, 8 to 15 wt % of isocyanate compound, 0.1 to 5 wt % of emulsifier, and the rest water and may include a total solid content of 15 to 30 wt %. The water dispersed or aqueous coating composition is prepared by preparing the water dispersed or aqueous polyurethane binder having a solid content of 15 to 30 wt % and then, mixing the water dispersed or aqueous polyurethane binder with additives such as wetting agent, silica, inorganic filler, or the like, and water. In this case, the total content of solid is coated while being controlled to be 2 to 10 wt %, which makes it easy to control the coating thickness.

In the present invention, the reactive emulsifier has a functional group of anionic hydrophilic group or a cationic hydrophilic group, wherein as the anionic hydrophilic group and the cationic hydrophilic group, the hydrophilic group and the cationic hydrophilic group having a polymerizable unsaturated group may be used. The reactive emulsifier may include the anionic hydrophilic group or the cationic hydrophilic group as the functional group.

An example of the anionic hydrophilic group may include —$SO_2M$, —$SO_3M$, —COOM, —$PO_3M_2$ or —$PO_3$ MH functional group (M is hydrogen atom, alkali earth metal atom such as lithium, sodium, potassium or ammonium salts), or the like. An example of the anionic hydrophilic group may include alkyl amine and ethoxylate amine derivative, alkyl imidazolin derivative, quaternary ammonium halide functional group, which may be optionally used.

The cationic reactive emulsifier, which is an cationic material having a polymerizable unsaturated bond, may be a material having an ether group, an ester group, a sulfone group, a sulfoxide group, a sulfide group, or a hydroxyl group, besides a material having a double bond and an alkyl group, an aromatic compound, or an cationic group. The cationic group may be composed of a sulfonic acid group, a carboxylic acid group, a phosphate group, a sulfonate group, or a salt thereof. The anionic reactive emulsifier, which is a cationic material having a polymerizable unsaturated bond, may be a material having alkyl and aromatic compound, besides a material having a double bond and an anionic group and may also be material having a functional group such as an ether group, an ester group, a sulfone group, a sulfoxide group, a sulfide group, or a hydroxyl group.

The high refractive inorganic filler use at least one of ZnO, $TiO_2$, $CeO_2$, $SnO_2$, and $ZrO_2$ and the size of the high refractive inorganic filler may be set to be 100 nm in maximum, more preferably, 30 nm or less, in detail, 1 to 10 nm. When the size of the high refractive inorganic filler exceeds 100 nm, the optical characteristics of the optical film, in particular, haze may be increased.

The polyurethane coating composition may be coated at a dry coating thickness of 15 to 150 nm, which may implement the targeted refractive index. A coating method may perform in line coating that coats the surface during the stretching process of the polyester film and perform off line coating after the film is manufactured. Further, both coating may be simultaneously performed. Preferably, the in line coating is preferable since the coating is performed while removing the film to save the manufacturing costs and the thickness of the coating layer may be changed according to the stretched magnification.

Advantageous Effects

The optical film according to the present invention can have the adhesion appropriate to be used as the hard coating film and improve the rainbow phenomenon.

BEST MODE

Hereinafter, the present invention will be described by way of example, but the present invention is not limited to the following example.

A method of measuring physical properties shown in the following examples and comparative examples is as follows.

1) Measurement of total light transmittance: the total light transmittance of the entire film was measured by a total light transmittance meter (Nippon Denshoku 300A) after the polyurethane coating layer is coated on the base film, that is, the polyethylene terephthalate film.

2) Measurement of refractive index: the refractive index was measured at normal temperature by an ABBE refractometer (ATAGO Co. DR-M2) that is a refractive index meter after the aqueous urethane binder is coated on the polycarbonate film and dried.

3) Measurement-1 of rainbow phenomenon: it was confirmed whether the rainbow is generated with the naked eye by performing the hard coating processing (refractive index 1.52) on one surface of the optical film and blackening the other surface thereof, after manufacturing the optical film according to the example and the comparative example. The visual assessment was performed under a tri-wave lamp in a dark room.

The assessment criteria are as follows.

Top: the rainbow phenomenon is not shown and the uniform impression of color is shown.

Middle: the rainbow phenomenon is shown lightly and the uniform impression of color is shown.

Bottom: the rainbow phenomenon is shown deeply and the strong impression of color is shown.

4) Measurement-2 of rainbow phenomenon: the reflective pattern in a visible ray region was measured by UV-visible (CARY 5000) by performing the hard coating processing (refractive index 1.52) on one surface of the optical film and blackening the other surface thereof, after manufacturing the optical film according to the example and the comparative example.

Top: the ripple amplitude in 500 to 600 nm is reduced as compared with the ripple amplitude in another wavelength band and the ripple amplitude is 1% or less.

Middle: the ripple amplitude in 500 to 600 nm is reduced as compared with the ripple amplitude in another wavelength band and the ripple amplitude is 3% or less.

Bottom: the wavelength band in which the ripple amplitude is not 500 to 600 nm or the wavelength band of which the amplitude is reduced is not shown.

5) Measurement (ASTM B905) of adhesion with hard coating layer.

After manufacturing the optical film according to the example and the comparative example, the adhesion at normal temperature after performing the hard coating on one surface on which the polyurethane coating composition is coated and the adhesion between the hard coating layer and the polyurethane coating layer after performing high temperature hot water treatment (100° C., 10 min) were assessed.

Figure 1:
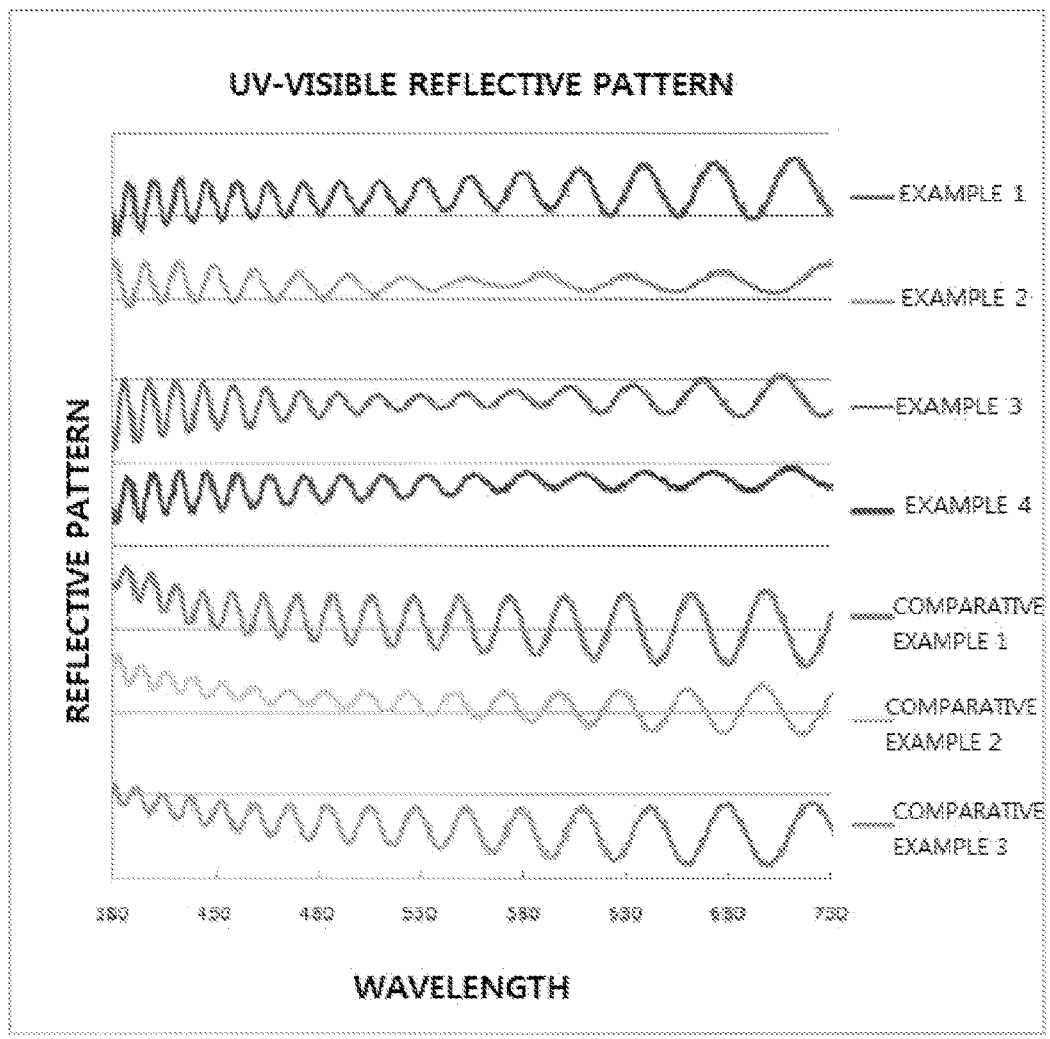
FIG. 1 is a graph showing the reflective pattern according to the example and the comparative example.
Figure 2:
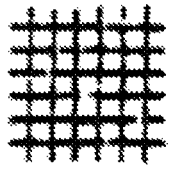
FIG. 2 is a standard for evaluating the adhesiveness.
Figure 2:
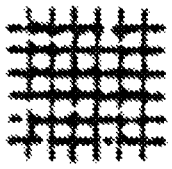
Figure 2:
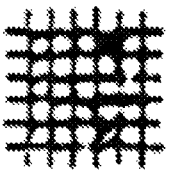
Figure 2:
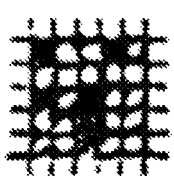

As shown in FIG. 2, the case in which 100% remains in a lattice is set to be 5 points, the case in which 95% remains therein is set to be 4 points, the case in which 95 to 85% remains therein is set to be 3 points, the case in which 85 to 65% remains therein is set to be 2 points, and the case in which 65% or less remains therein is set to be 0 points.

6) Measurement of dry coating thickness: the cross section of the film was measured by SEM (Hitachi S-4300) by setting the whole width of the base film on which the polyurethane coating composition to be 5 point at an interval of 1 m in a transverse direction (TD) with respect to a machine direction and the average value was calculated.

Example 1

Preparation of Polyurethane Coating Composition (1)

The aqueous polyurethane binder having a solid content of 20 wt % was prepared by reacting 9 wt % of polyester based polyol (polyethylene adipatediol of which the weight-average molecular weight is 1000), 10 wt % of isocyanate mixture in which hexamethylene diisocyanate and 2,6-naphthalene diisocyanate are mixed at 25:75 wt %, 1 wt % of reactive emulsifier (Asahi Denka, Adecaria Soap that is sulfonic acid ester of polyoxy ethylene allyl glycidyl nonyl phenyl ether (SETM)) having an ionic group, and 80 wt % of water. The result of measuring the refractive index of the prepared aqueous polyurethane binder was 1.57.

25 wt % of the aqueous polyurethane binder, 0.3 wt % of silicon based wetting agent (Dow Corning Co. polyester siloxane copolymer), 6 wt % of zirconia sol having an average particle size of 5 nm (a solid content of 30 wt %, a refractive index of 2.15), 0.3 wt % of colloid silica filler having an average particle size of 140 nm were added to water and then, agitated for three hours to prepare polyurethane coating composition (1) having a total solid content of 6.5 wt %.

Manufacturing One-Sided Coating Polyester Film

The polyethylene terephthalate sheet having a thickness of 2000 μm was manufactured by putting the polyethylene terephthalate chip from which moisture is removed in an extruder to be melt-extruded and then, suddenly cooling and solidifying it by a casting drum of which the surface temperature is 20° C. The manufactured polyethylene terephthalate sheet was stretched 3.5 times in a machine direction (MD) at 80° C. and then, cooled at normal temperature. Thereafter, the polyurethane coating composition (1) was coated on one surface by a bar coating method and was then preheated and dried by increasing temperature by 1° C. per second until being reached to 110 to 150° C. and was stretched 3.5 times in a transverse direction (TD). Hereinafter, the biaxial stretched film of 188 μm coated on one surface was manufactured by being subjected to the heat treatment at 235° C. in a five step tenter, being released 10% in a machine direction and a transverse direction at 200° C., and being heat-set. The dry coating thickness of the polyurethane coating layer was 100 nm.

The physical properties of the obtained optical film were shown in Table 1.

Example 2

Manufacturing of Double-Sided Coating Polyester Film

The polyethylene terephthalate sheet having a thickness of 2000 μm was manufactured by putting the polyethylene terephthalate chip from which moisture is removed in an extruder to be melt-extruded and then, suddenly cooling and solidifying it by a casting drum of which the surface temperature is 20° C. The manufactured polyethylene terephthalate sheet was stretched 3.5 times in a machine direction (MD) at 80° C. and then, cooled at normal temperature. Thereafter, the polyurethane coating composition (1) prepared in Example 1 was coated on both surfaces by a bar coating method and was then preheated and dried by increasing temperature by 1° C. per second until being reached to 110 to 150° C. and was stretched 3.5 times in a transverse direction (TD). Hereinafter, the biaxial stretched film of 188 μm coated on one surface was manufactured by being subjected to the heat treatment at 235° C. in a five step tenter, being released 10% in a machine direction and a transverse direction at 200° C., and being heat-set. The dry coating thickness of the each polyurethane coating layer was 100 nm. The physical properties of the obtained optical film were shown in Table 1.

Example 3

Preparation of Polyurethane Coating Composition (2)

The aqueous polyurethane binder having a solid content of 20 wt % was prepared by reacting 9 wt % of polyester based polyol (polyethylene adipatediol of which the weight-average molecular weight is 1000), 10 wt % of isocyanate mixture in which hexamethylene diisocyanate and 2,6-naphthalene diisocyanate are mixed at 10:90 wt %, 1 wt % of reactive emulsifier (Asahi Denka, Adecaria Soap that is sulfonic acid ester of polyoxy ethylene allyl glycidyl nonyl phenyl ether (SETM)) having an ionic group, and 80 wt % of water. The result of measuring the refractive index of the prepared aqueous polyurethane binder was 1.59.

25 wt % of the aqueous polyurethane binder, 0.3 wt % of silicon based wetting agent (Dow Corning Co. polyester siloxane copolymer), 4 wt % of zirconia sol having an average particle size of 5 nm (30 wt % of solid, a refractive index of 2.15), 0.3 wt % of colloid silica filler having an average particle size of 140 nm were added to water and then, agitated for three hours to prepare polyurethane coating composition (2) having a total solid content of 4 wt %.

Manufacturing of Double-Sided Coating Polyester Film

The polyethylene terephthalate sheet having a thickness of 2000 μm was manufactured by putting the polyethylene terephthalate chip from which moisture is removed in an extruder to be melt-extruded and then, suddenly cooling and solidifying it by a casting drum of which the surface temperature is 20° C. The manufactured polyethylene terephthalate sheet was stretched 3.5 times in a machine direction (MD) at 80° C. and then, cooled at normal temperature. Thereafter, the polyurethane coating composition (2) was coated on both surfaces by a bar coating method and was then preheated and dried by increasing temperature by 1° C. per second until being reached to 110 to 150° C. and was stretched 3.5 times in a transverse direction (TD). Hereinafter, the biaxial stretched film of 188 μm coated on both surfaces was manufactured by being subjected to the heat treatment at 235° C. in a five step tenter, being released 10% in a machine direction and a transverse direction at 200° C., and being heat-set. The dry coating thickness of the each polyurethane coating layer was 90 nm.

The physical properties of the obtained optical film were shown in Table 1.

Example 4

Manufacturing of Double-Sided Coating Polyester Film

The polyethylene terephthalate sheet having a thickness of 2000 μm was manufactured by putting the polyethylene terephthalate chip from which moisture is removed in an extruder to be melt-extruded and then, suddenly cooling and solidifying it by a casting drum of which the surface temperature is 20° C. The manufactured polyethylene terephthalate sheet was stretched 3.5 times in a machine direction (MD) at 80° C. and then, cooled at normal temperature. Thereafter, the polyurethane coating composition (1) prepared in Example 3 was coated on one surface by the bar coating method and then, the polyurethane coating composition (2) prepared in Example 4 was coated on the other surface by the bar coating method and was then preheated and dried by increasing temperature by 1° C. per second until being reached to 110 to 150° C. and was stretched 3.5 times in a transverse direction (TD). Hereinafter, the biaxial stretched film of 188 μm coated on both surfaces was manufactured by being subjected to the heat treatment at 235° C. in a five step tenter, being released 10% in a machine direction and a transverse direction at 200° C., and being heat-set. The dry coating thickness of the polyurethane coating composition (1) was 100 nm and the dry coating thickness of the each polyurethane coating composition (2) was 90 nm.

Comparative Example 1

The polyethylene terephthalate sheet having a thickness of 2000 μm was manufactured by putting the polyethylene terephthalate chip from which moisture is removed in an extruder to be melt-extruded and then, suddenly cooling and solidifying it by a casting drum of which the surface temperature is 20° C. The manufactured polyethylene terephthalate sheet was stretched 3.5 times in a machine direction (MD) at 80° C. and then, cooled at normal temperature. Thereafter, the polyethylene terephthalate sheet was preheated and dried by increasing temperature by 1° C. per second until being reached to 110 to 150° C. and was stretched 3.5 times in a transverse direction (TD). Hereinafter, the non-coated biaxial stretched film of 188 μm was manufactured by being subjected to the heat treatment at 235° C. in a five step tenter, being released 10% in a machine direction and a transverse direction at 200° C., and being heat-set.

The physical properties of the obtained optical film were shown in Table 1.

Comparative Example 2

Preparation of Polyurethane Coating Composition (3)

The aqueous polyurethane binder having a solid content of 20 wt % was prepared by reacting 9 wt % of polyester based polyol (polyethylene adipatediol of which the weight-average molecular weight is 1000), 10 wt % of isocyanate mixture in which hexamethylene diisocyanate and 2,6-naphthalene diisocyanate are mixed at 25:75 wt %, 1 wt % of reactive emulsifier (Asahi Denka, Adecaria Soap that is sulfonic acid ester of polyoxy ethylene allyl glycidyl nonyl phenyl ether (SETM)) having an ionic group, and 80 wt % of water. The result of measuring the refractive index of the prepared aqueous polyurethane binder was 1.57.

25 wt % of the aqueous polyurethane binder, 0.3 wt % of silicon based wetting agent (Dow Corning Co. polyester siloxane copolymer), 0.3 wt % of colloid silica filler having an average particle size of 140 nm were added to water and then, agitated for three hours to prepare polyurethane coating composition (3) having a total solid content of 6.5 wt %.

Manufacturing of Double-Sided Coating Polyester Film

The polyethylene terephthalate sheet having a thickness of 2000 μm was manufactured by putting the polyethylene terephthalate chip from which moisture is removed in an extruder to be melt-extruded and then, suddenly cooling and solidifying it by a casting drum of which the surface temperature is 20° C. The manufactured polyethylene terephthalate sheet was stretched 3.5 times in a machine direction (MD) at 80° C. and then, cooled at normal temperature. Thereafter, the polyurethane coating composition (3) was coated on both surfaces by the bar coating method and was then preheated and dried by increasing temperature by 1° C. per second until being reached to 110 to 150° C. and was stretched 3.5 times in a transverse direction (TD). Hereinafter, the biaxial stretched film of 188 μm coated on both surfaces was manufactured by being subjected to the heat treatment at 235° C. in a five step tenter, being released 10% in a machine direction and a transverse direction at 200° C., and being heat-set. The dry coating thickness of the each polyurethane coating layer was 80 nm.

Comparative Example 3

Preparation of Polyurethane Coating Composition (4)

The aqueous polyurethane binder having a solid content of 20 wt % was prepared by reacting 9 wt % of polyester based polyol (polyethylene adipatediol of which the weight-average molecular weight is 1000), 10 wt % of hexamethylene diisocyanate and 2,6-naphthalene diisocyanate, 1 wt % of reactive emulsifier (Asahi Denka, Adecaria Soap that is sulfonic acid ester of polyoxy ethylene allyl glycidyl nonyl phenyl ether (SETM)) having an ionic group, and 80 wt % of water. The result of measuring the refractive index of the prepared aqueous polyurethane binder was 1.53.

25 wt % of the aqueous polyurethane binder, 0.3 wt % of silicon based wetting agent (Dow Corning Co. polyester siloxane copolymer), 0.15 wt % of colloid silica filler having an average particle size of 140 nm, were added to water and then, agitated for three hours to prepare polyurethane coating composition (4) having a total solid content of 5 wt %.

Manufacturing of Double-Sided Coating Polyester Film

The polyethylene terephthalate sheet having a thickness of 2000 μm was manufactured by putting the polyethylene terephthalate chip from which moisture is removed in an extruder to be melt-extruded and then, suddenly cooling and solidifying it by a casting drum of which the surface temperature is 20° C. The manufactured polyethylene terephthalate sheet was stretched 3.5 times in a machine direction (MD) at 80° C. and then, cooled at normal temperature. Thereafter, the polyurethane coating composition (4) was coated on one surface by the bar coating method and was then preheated and dried by increasing temperature by 1° C. per second until being reached to 110 to 150° C. and was stretched 3.5 times in a transverse direction (TD). Hereinafter, the biaxial stretched film of 188 μm coated on both surfaces was manufactured by being subjected to the heat treatment at 235° C. in a five step tenter, being released 10% in a machine direction and a transverse direction at 200° C., and being heat-set. The dry coating thickness of the each polyurethane coating layer was 80 nm.

TABLE 1

| | Refractive Index | | | Inorganic Filler Content | | Adhesion with | | | |
|---|---|---|---|---|---|---|---|---|---|
| | First Coating Layer Binder | Base Film | Second Coating Layer Binder | First Coating Layer | Second Coating Layer | Hard coating layer | Ripple Amplitude | Ripple Convergence | Rainbow Phenomenon |
| Example 1 | 1.57 | 1.64 | — | 6% | 0% | 5 | 0.63 | 500~600 nm | Top |
| Example 2 | 1.57 | 1.64 | 1.57 | 6% | 6% | 5 | 0.19 | 500~600 nm | Top |
| Example 3 | 1.59 | 1.64 | 1.59 | 4% | 4% | 4 | 0.16 | 500~600 nm | Top |
| Example 4 | 1.57 | 1.64 | 1.59 | 6% | 4% | 5 | 0.39 | 500~600 nm | Top |
| Comparative Example 1 | — | 1.64 | — | 0% | 0% | 0 | 1.23 | Short Wavelength | Bottom |
| Comparative Example 2 | 1.57 | 1.64 | 1.57 | 0% | 0% | 5 | 0.415 | Short Wavelength | Midlle |
| Comparative Example 3 | 1.53 | 1.64 | 1.53 | 0% | 0% | 5 | 0.899 | Short Wavelength | Bottom |

The invention claimed is:

1. An optical film, comprising:
   a biaxially stretched polyester base film; and
   a polyurethane coating layer on one surface or both surfaces of the base film, wherein the polyurethane coating layer is formed from a polyurethane coating composition comprising a polyurethane binder having a refractive index of 1.54 to 1.59 and a high refractive inorganic filler having a refractive index of 2.0 or more,
   wherein the polyurethane binder is prepared by reacting a polyol with an isocyanate compound including at least one aromatic isocyante compound of the following Formula 1:

OCN—Ar—NCO      Formula 1 wherein Ar is naphthalene or phenalene.

2. The optical film of claim 1, wherein the high refractive inorganic filler is one or a mixture of two or more selected from the group consisting of ZnO, $TiO_2$, $CeO_2$, $SnO_2$, and $ZrO_2$.

3. The optical film of claim 1, wherein the amount of the aromatic isocyanate compound is 25 to 90 wt % based on the total content of the isocyanate compound.

4. The optical film of claim 1, wherein the polyurethane coating composition has a total solid content of 2 to 10 wt %;
   wherein the polyurethane coating composition comprises 5 to 30 wt % of the polyurethane binder, 0.5 to 30 wt % of the high refractive inorganic filler which has a solid content of 5 to 40 wt %, 0.1 to 0.4 wt % of wetting agent, and 0.1 to 0.5 wt % of silica having an average particle size of 100 to 200 nm; and
   wherein said high refractive inorganic filler is dispersed in water.

5. The optical film of claim 4, wherein the polyurethane binder is an aqueous polyurethane binder having a solid content of 15 to 30 wt %; and wherein the polyurethane binder comprises water and a reactive emulsifier having ionic groups.

6. The optical film of claim 4, wherein the high refractive inorganic filler has an average particle size less than 30 nm.

7. The optical film of claim 1, wherein the thickness of the polyurethane coating layer in dry state is 15 to 150 nm.

8. The optical film of claim 1, wherein the base film is a polyethyleneterephthalate film.

9. The optical film of claim 8, wherein the optical film further includes a hard coating layer.

* * * * *